(No Model.)

J. H. HURLEY.
LATHE TOOL.

No. 488,145. Patented Dec. 13, 1892.

Witnesses
H. T. Giddings
G. B. Jenkins

Inventor
James H. Hurley,
by Chas. L. Burdett,
Attorney

UNITED STATES PATENT OFFICE.

JAMES H. HURLEY, OF HARTFORD, CONNECTICUT, ASSIGNOR OF ONE-HALF TO WILLIAM J. SHEA, OF SAME PLACE.

LATHE-TOOL.

SPECIFICATION forming part of Letters Patent No. 488,145, dated December 13, 1892.

Application filed April 25, 1892. Serial No. 430,456. (No model.)

*To all whom it may concern:*

Be it known that I, JAMES H. HURLEY, of Hartford, in the county of Hartford and State of Connecticut, have invented certain new and useful Improvements in Lathe-Tools, of which the following is a full, clear, and exact description, whereby any one skilled in the art can make and use the same.

My invention relates to the class of tools that are used in lathes or like machine-tools for cutting purposes, either in reducing the size of the work or for cutting off any desired length; and the object of my invention is to provide a cutting-off tool of this class that may be used in a lathe at any desired distance from the live spindle or work-holding arbor without incurring any danger of breakage of the tool or of faulty work by reason of the springing of the piece that is being cut.

To this end my invention consists in the combination, details of the several parts making up the cutting-off tool and rest as a whole, and in their combination, as more particularly hereinafter described, and pointed out in the claims.

Figure 1:
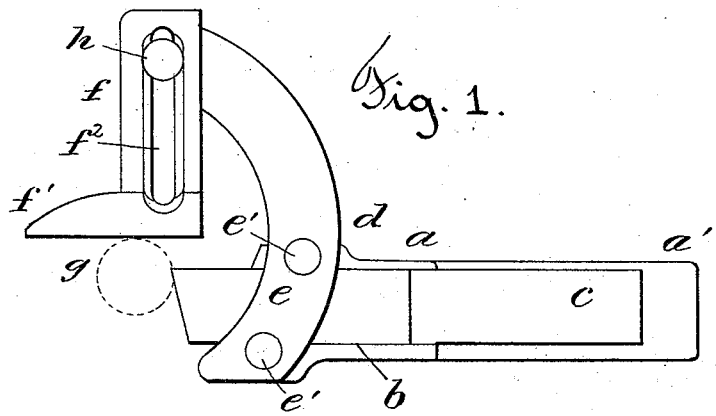
Figure 2:
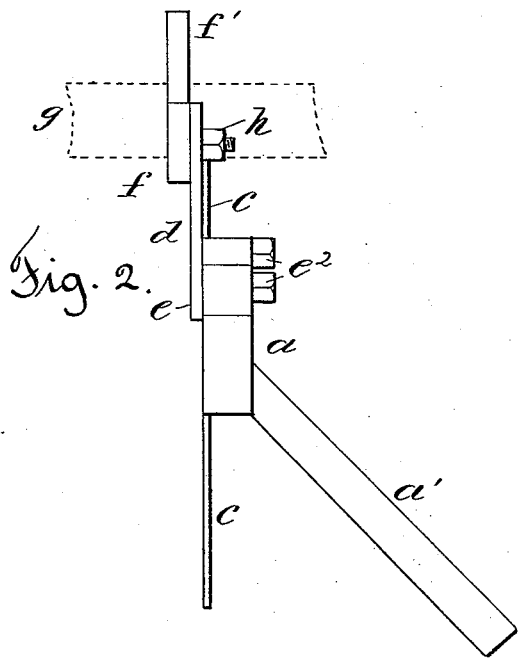
Figure 3:
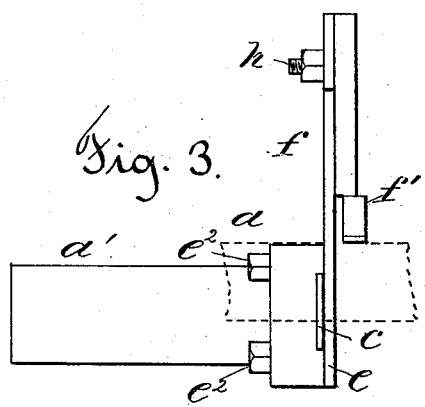

Referring to the drawings, Figure 1 is a detail side view of a cutting-off tool embodying my invention. Fig. 2 is a detail top or plan view of the same. Fig. 3 is a detail view in front elevation of the same.

In the accompanying drawings, the letter $a$ denotes the stock or body part of a tool-holder with a tool-holding socket $b$, in which a cutting tool or blade $c$ may be secured, as by means of a clamping device $d$. This clamp device consists of a strap $e$, which is secured to the body part by means of the bolts $e'$, passing through sockets in the body part at points preferably above and below the tool-holding socket and projecting far enough beyond to receive the nuts $e^2$, by turning which the tool may be securely clamped within the tool-holding socket in the stock, with its cutting end projecting the proper distance beyond the front end of the stock. From the stock or a part secured thereto a work-rest $f$ projects forward a distance sufficient to enable its foot $f'$ to overlie and rest upon a piece of work $g$, that is held in the lathe-arbor or like part in a lathe or other machine tool.

In the form of my invention herein shown the work-rest is formed by extending the strap upward and forward, as shown in Fig. 2 of the drawings, the foot-piece $f'$ being adjustably secured to this arm by means of a clamping-bolt $h$, passing through the slot $f^2$, formed in one of the parts, the nut fitting the threaded portion of the clamp-bolt serving as one of the means for binding the parts together.

The cutting-off tool shown in the within drawings is provided with a shank $a'$, that adapts it to be held in any ordinary form of tool-post, and when so held in the tool-post of a lathe the tool is used by setting the point of the cutting-off tool at a level about opposite the center of the work, with the foot-piece of the rest in contact with the upper surface of the work or article that is to be cut. The tool is then used in the ordinary manner by being fed up toward the work by any common means, and by the use of the work-rest in connection with the cutting-tool all springing and uneven movement of the work is obviated, and the tool may be used at any desired distance from the immediate point of support of the work and on work of very small diameter and with certainty and precision.

It is an advantage to have the work-rest overlie the work on the cutting side of the tool that is nearest to the work-holding spindle or chuck, as by that means all accidental breaking off of the outer piece before the cut is completed is obviated.

It is not essential that the rest shall be located in the same vertical plane with the cutting-tool, and the term "overlying" is used in the claims herein to describe simply the arrangement of the tool-rest in a plane above the plane of the cutting-point of the tool.

Prior to my invention it has been necessary to use a center rest in a large class of work in which a cutting-off tool particularly is used, and the placing of this rest, as well as the breaking and spoiling of pieces of work and of cutters, has caused a serious loss in time and material. All this is obviated by my improvement, that comprises in a tool of this class carrying a cutting-tool a work-rest that is used to back up and support the work while the cutting operation is in progress.

I claim as my invention—

1. In combination, in a cutting-off tool, the body part having the tool-holding socket, the cutter-blade fitting the tool-socket, the tool-clamp comprising a strap with its upper end projecting above and beyond the end of the tool-body, the adjustable work-rest, and means for clamping the work-rest to the arm, all substantially as described.

2. In combination, in a cutting-off tool, the body part with the blade-holding socket formed in the side of the stock, the cutting-blade fitting the tool-socket, the tool-clamp comprising clamping-bolts, a strap overlying the socket and projecting above the stock, and the work-rest comprising the slotted foot-piece adjustably secured to the strap, all substantially as described.

3. In combination, in a cutting-off tool, the body part having the tool-holding socket, the cutter-blade fitting said socket, the tool-clamp comprising a strap with its upper end projecting above and beyond the end of the tool-body, and the adjustable work-rest secured to the arm and having a movement across the axis of the work in the same plane and coincident with the cutting-off tool, all substantially as described.

4. In combination, in a cutting-off tool, the body part having the tool-holding socket, the cutter-blade fitting said socket, the tool-clamp comprising a strap with its upper end projecting above and beyond the end of the tool-body, and the work-rest comprising the slotted foot-piece having a flat under surface and adjustably secured to the strap, all substantially as described.

JAMES H. HURLEY.

Witnesses:
  CHAS. L. BURDETT,
  W. J. SHEA.